United States Patent
Kumai

(10) Patent No.: US 8,094,373 B2
(45) Date of Patent: Jan. 10, 2012

(54) POLARIZATION ELEMENT, METHOD FOR MANUFACTURING THE SAME, LIQUID CRYSTAL DEVICE, AND ELECTRONIC APPARATUS

(75) Inventor: Yoshitomo Kumai, Okaya (JP)

(73) Assignee: Seiko Epson Corporation (JP)

( * ) Notice: Subject to any disclaimer, the term of this patent is extended or adjusted under 35 U.S.C. 154(b) by 449 days.

(21) Appl. No.: 12/191,340

(22) Filed: Aug. 14, 2008

(65) Prior Publication Data
US 2009/0066885 A1 Mar. 12, 2009

(30) Foreign Application Priority Data
Sep. 12, 2007 (JP) ................. 2007-236596

(51) Int. Cl.
*G02B 5/30* (2006.01)
(52) U.S. Cl. ................. 359/485.05
(58) Field of Classification Search .......... None
See application file for complete search history.

(56) References Cited

U.S. PATENT DOCUMENTS

| | | | |
|---|---|---|---|
| 6,884,500 B2 | 4/2005 | Edlinger et al. | |
| 7,026,046 B2 | 4/2006 | Edlinger et al. | |
| 7,349,612 B2 | 3/2008 | Nishii et al. | |
| 7,371,329 B2 | 5/2008 | Edlinger et al. | |
| 7,507,467 B2 | 3/2009 | Edlinger et al. | |
| 7,670,758 B2 * | 3/2010 | Wang et al. | 430/321 |
| 2005/0128592 A1 * | 6/2005 | Nishii et al. | 359/573 |
| 2006/0087602 A1 * | 4/2006 | Kunisada et al. | 349/96 |
| 2006/0119937 A1 * | 6/2006 | Perkins et al. | 359/486 |
| 2006/0274218 A1 * | 12/2006 | Xue | 349/16 |

FOREIGN PATENT DOCUMENTS

| | | |
|---|---|---|
| JP | 2005-037872 | 2/2005 |
| JP | 2005-517973 | 6/2005 |
| JP | 2007-017762 | 1/2007 |
| JP | 2008-145573 | 6/2008 |
| WO | WO 01/51964 | 7/2001 |
| WO | WO 03/054619 | 7/2003 |

* cited by examiner

*Primary Examiner* — Derek S Chapel
(74) *Attorney, Agent, or Firm* — Harness, Dickey & Pierce, P.L.C.

(57) ABSTRACT

A polarization element including a plurality of protection films, one of the plurality of protection films being provided on one of the plurality of metal thin wires. The plurality of metal thin wires includes a first metal thin wire, and a second metal thin wire adjacent to the first metal thin wire. The plurality of protection films includes a protection first film and a second protection film. A first mask is provided between the upper end of the first metal thin wire and the first protection film, and a second mask is provided between the upper end of the second metal thin wire and the second protection film. The first and second protection films form an air gap below the first mask.

11 Claims, 7 Drawing Sheets

<RUBBING CONDITIONS>

| | LEVEL 1 (STANDARD CONDITION) | LEVEL 2 | LEVEL 3 | LEVEL 4 |
|---|---|---|---|---|
| NUMBER OF ROTATIONS(rpm) | 750 | ← | 850 | ← |
| FEEDING SPEED(mm/sec) | 25 | ← | 25 | ← |
| PUSHING QUANTITY(mm) | 0.4 | ← | 0.4 | ← |
| ITERATION COUNT(TIMES) | 1 | ← | 1 | ← |
| RUBBING DIRECTION(TO WG) | PARALLEL | VERTICAL | PARALLEL | VERTICAL |

<RESULTS>

| | | | | |
|---|---|---|---|---|
| WORKING EXAMPLE | A | A | A | A |
| COMPARATIVE EXAMPLE | A | B | B | B |

POLARIZATION ELEMENT, METHOD FOR MANUFACTURING THE SAME, LIQUID CRYSTAL DEVICE, AND ELECTRONIC APPARATUS

BACKGROUND

1. Technical Field

The present invention relates to a polarization element, a method for manufacturing the same, a liquid crystal device, and an electronic apparatus.

2. Related Art

Liquid crystal devices are used as an optical modulator of various electro-optic devices. Such structure of liquid crystal devices are widely known that a liquid crystal layer is sandwiched in between a pair of substrates that are disposed in an opposed manner. The devices are commonly provided with a polarization element and an alignment film. The polarization element allows predetermined polarized light to enter the liquid crystal layer, and the alignment film controls an alignment of liquid crystal molecules when no voltage is applied.

As a polarization element, a film type polarization element and a wire grid type polarization element are known. The film type polarization element is manufactured such that a resin film is extended in one direction so as to align components of the resin film in an extending direction. The wire grid type polarization element is structured such that nanoscale metal thin wires are laid over a transparent substrate. Especially, the wire grid type polarization element can be built in a liquid crystal device, thereby being considered to be effective for thinning the liquid crystal device.

However, the metal thin wires provided to the wire grid type polarization element are too fragile to be damaged even by slight contact, being very hard to be handled. For example, in a process for manufacturing a liquid crystal device in which a wire grid type polarization element is included, a polyimide film is formed on a surface of the polarization element so as to form an alignment film. The alignment film is formed by performing a rubbing treatment with respect to the surface of the polyimide film in a predetermined direction. In this rubbing treatment, the metal thin wires may be disadvantageously damaged. Therefore, the metal thin wires have to be properly protected so as not to be damaged.

Here, optical characteristics of the polarization element are affected by a material disposed between the metal thin wires, and a preferable refractive index is 1. Namely, it is best to fill between the metal thin wires with air (or to be vacuumed). Therefore, if gaps between the metal thin wires are completely filled with a protection material such as transparent resin for protecting the polarization element, the optical characteristics may be deteriorated.

JP-T-2003-519818 as a first example and JP-T-2005-513547 as a second example disclose a method for solving these problems. Namely, the method is such that a transparent substrate serving as a protection member is disposed in a manner being opposed to a forming surface of metal thin wires so as to prevent the metal thin wires from being damaged. Further, JP-A-2007-17762 as a third example discloses such method that a protection layer is formed on an upper surface of metal thin wires by sputtering so as to protect the metal thin wires.

However, the method disclosed in the first and second examples has such problem that the thickness of the whole of the polarization element is increased because of the transparent substrate used as the protection member for the metal thin wires. In a case of building the polarization element in a liquid crystal device, the thickness of the protection film disadvantageously prevents the device to be thinned. Further, the method disclosed in the third example employs a sputtering method by which a film is slowly formed, so that it takes long period of time to form the protection film having enough thickness. In addition, in the method, the upper surface of the metal thin wires is protected but the metal thin wires themselves are not reinforced, so that the wires are damaged in the rubbing treatment described above.

SUMMARY

An advantage of the present invention is to provide a wire grid type polarization element that has resistance to a rubbing treatment and suppresses deterioration of its optical characteristics, and a manufacturing method of the same. Another advantage of the invention is to provide a liquid crystal device and an electronic apparatus provided with such polarization element and therefore having high display-quality and high reliability.

A polarization element according to a first aspect of the invention includes: a base; a plurality of metal thin wires provided on the base along a predetermined alignment axis; and a plurality of protection films covering each of the plurality of metal thin wires. In the element, each of the protection films covers an upper end and both sidewalls of one of the metal thin wires. Further, a width of a part, which is on the upper end of the one of the metal thin wires, of the each of the protection films in a direction of the alignment axis is larger than a width obtained by summing a width of the one of the metal thin wires in the direction of the alignment axis and widths of parts, which are on the both sidewalls of the one of the metal thin wires, of the each of the protection films in the direction of the alignment axis. The protection films on sidewalls, which are opposed to each other, of the metal thin wires that are adjacent form an air gap.

According to the polarization element having such structure, the upper end and the both sidewalls of the metal thin wires are reinforced by the protection films, being able to prevent the metal thin wires from being damaged. Further, the width of the part, which is on the upper end of the metal thin wires, of the each of the protection films is larger than the width of the metal thin wires, so that the protection films narrow an upper part of space formed between the metal thin wires that are adjacent. Therefore, in a case where other material is deposited on the metal thin wires as well, the protection films can prevent deposited substance from entering the space formed between the metal thin wires. Accordingly, the space between the metal thin wires is not filled, providing the polarization element having excellent optical characteristics.

It is preferable that parts, which are on upper ends of the metal thin wires that are adjacent, of the protection films contact with each other in a direction parallel to the direction of the alignment axis.

According to the structure, the parts, which are on the upper ends of the metal thin wires that are adjacent, of the protection films contact with each other, so that an air gap in which air can be sealed (or that can be vacuumed) is formed. Therefore, the polarization element having excellent optical characteristics can be obtained.

It is preferable that a plurality of deposited films be formed on a surface, which is not face the air gap, of the parts, which are on the upper ends of the metal thin wires that are adjacent, of the protection films so as to form a protection layer.

According to the structure, the polarization element can be further reinforced by the deposited films. The deposited films can be made of an arbitrary material. For example, if the deposited films are made of a conductive substance, the films that are conductive are used as electrodes. Thus, a function can be added depending on the property of the deposited films.

It is preferable that the protection films be made of a translucent insulating material.

According to the structure, the metal thin wires are insulated from the surroundings. Therefore, in a case where the polarization element is built in a machine, it does not happen that wirings of the machine are disadvantageously communicated with the metal thin wires, being able to provide an electronic device that can operate stably.

A method for manufacturing a polarization element according to a second aspect of the invention includes: a) forming a plurality of metal thin wires provided on a base along a predetermined alignment axis; and b) forming a plurality of protection films covering an upper end and both sidewalls of each of the plurality of metal thin wires. In the method, in the step b), each of the protection films is formed on the upper end and the both sidewalls of one of the metal thin wires by a chemical vapor deposition (CVD) method, and a part, which is on the upper end of one of the one of the metal thin wires, of each of the protection films is allowed to grow by further progressing the formation of the protection film so as to make a width of a part, which is on the upper end of the one of the metal thin wires, of the each of the protection films in a direction of the alignment axis larger than a width obtained by summing a width of the one of the metal thin wires in the direction of the alignment axis and widths of parts, which are on the both sidewalls of the one of the metal thin wires, of the each of the protection films in the direction of the alignment axis.

Since the CVD method has a characteristic that the growing speed of a film to be formed (film-forming speed) is high, a film can be formed in high speed. If the formation of the protection film at a surface of the metal thin wires progresses, the protection films grow evenly on the upper end and the sidewalls of each of the metal thin wires in the early stage of the reaction.

If the reaction progresses, a space between the metal thin wires becomes narrow at an extent of the thickness at which the protection films grow, making hard for a material gas to go between the metal thin wires. Accordingly, the film-forming reaction progresses faster than the speed at which the material gas goes between the metal thin wires, so that the reaction becomes hard to occur between the metal thin wires because it is hard for the material gas to go between the wires, and the reaction of forming the protection films easily progresses at the upper ends of the metal thin wires. Thus the reaction of forming the protection films preferentially progresses at the upper ends of the metal thin wires, and thus the protection films grow so as to narrow the upper portion of the space between the metal thin wires that are adjacent.

If the protection films preferentially grow at the upper ends of the metal thin wires, it becomes furthermore harder for the material gas to go between the metal thin wires. Therefore, the film-growth between the metal thin wires stops, maintaining the space formed between the metal thin wires without filling the space with the protection films. As above, the metal thin wires can be effectively reinforced by the protection films and the space between the metal thin wires is not filled with the protection films in the protection-film forming in the polarization element. Thus, a polarization element having excellent optical characteristics can be easily manufactured.

It is preferable that a thickness of the protection films from the upper end of the metal thin wires in an orthogonal direction to the base be 50 nm and above.

If the reaction of forming the protection films preferentially progresses at the upper ends, the protection films grow in a direction orthogonal to the base from the upper ends of the metal thin wires as well as a direction in which the space at the upper part of the metal thin wires that are adjacent is narrowed. As the protection films grow, parts, which are on the upper ends of the metal thin wires that are adjacent, of the protection films contact with each other to be connected. A pitch of the metal thin wires varies depending on a design of the polarization element, but is preferably about a several fraction (more preferably about one tenth) of a wavelength of visible light at the maximum. Therefore, if the protection films having a thickness of about 50 nm are formed, the protection films can be connected with each other at the upper ends even in a case of the largest pitch. Accordingly, if the protection films are allowed to grow to have a thickness greater or equal to 50 nm, the parts, which are on the upper ends of the metal thin wires that are adjacent, of the protection films can be securely connected with each other, being able to firmly protect the metal thin wires. In addition, since the air gap surrounded by the protection films are formed between the metal thin wires that are adjacent, a polarization element having an optically advantageous structure in which air gaps are provided between the metal thin wires can be manufactured.

A liquid crystal device according to a third aspect of the invention includes: a pair of substrates; a liquid crystal layer sandwiched in between the pair of substrates; the above-described polarization element formed at a part, which is close to the liquid crystal layer, of at least one of the pair of substrates; and an alignment film provided at a part, which is closer to the liquid crystal layer than the polarization element, and formed by rubbing treatment.

According to the liquid crystal device of the third aspect, the polarization element reinforced with the protection films is used, the liquid crystal device having little image-quality deterioration caused by the damage of the polarization element and having an excellent reliability can be realized. In addition, air gaps between the metal thin wires can be made large so as to provide a liquid crystal device having excellent optical characteristics. Further, the liquid crystal device includes the polarization element that is provided with metal thin wires protected by very thin protection films so as to be thin, so that the liquid crystal device can be thinned.

An electronic apparatus according to a fourth aspect of the invention includes the above-described liquid crystal device as an optical modulator.

The electronic apparatus of the fourth aspect has high image quality and excellent reliability. Further, since the liquid crystal device is thinned, the whole of the electronic apparatus can be thinned.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
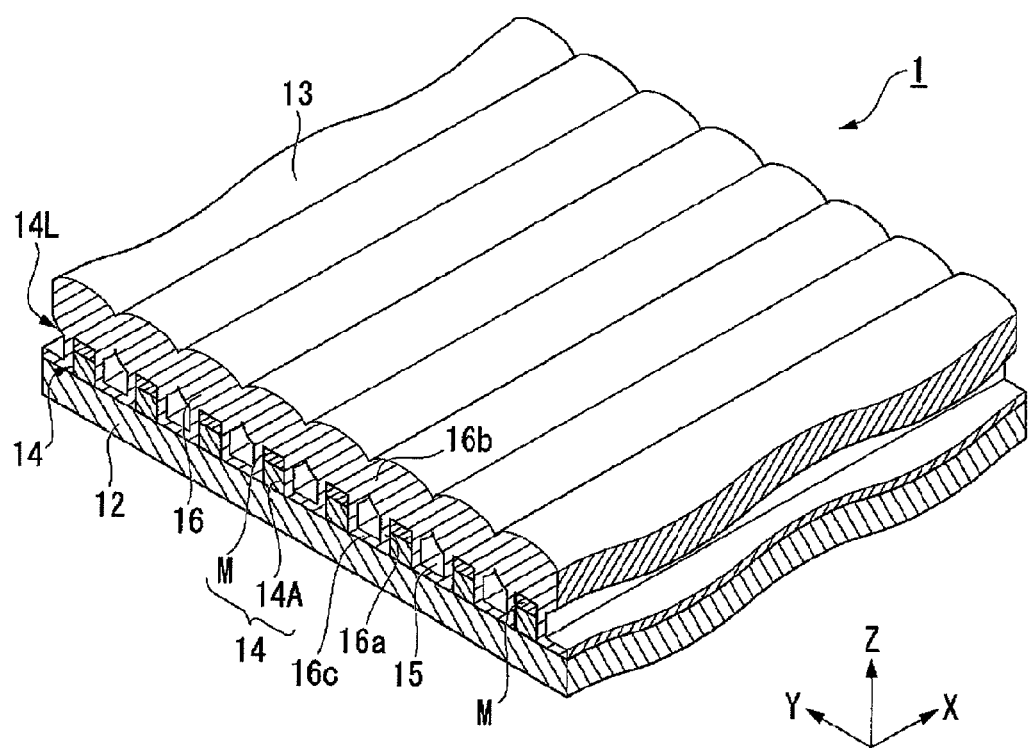
FIG. 1 is a schematic view showing a polarization element of an embodiment.
Figure 2:
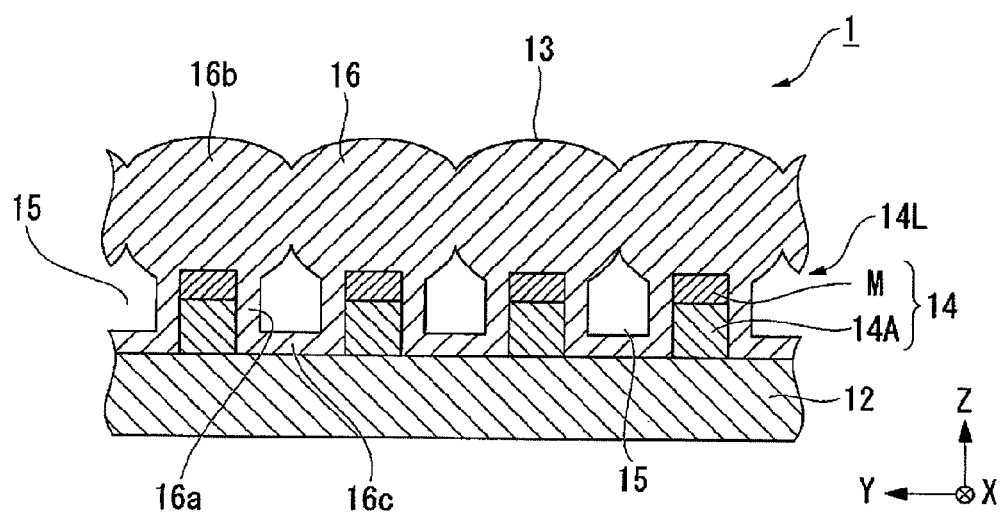
FIG. 2 is a sectional view showing a part of the polarization element.

A polarization element and a method for manufacturing a polarization element according to an embodiment of the present invention will now be described with reference to the accompanying drawings. FIG. 1 is a perspective view showing a part of a polarization element 1 of the embodiment. FIG. 2 is a sectional view showing a part of the polarization element 1 taken at YZ plane. In the following descriptions, an XYZ coordinate system is established, and a positional relation of elements will be described with reference to this system. Here, a predetermined direction on a level surface is indicated as X-axis direction; a direction perpendicular to the X-axis direction on the level surface is indicated as Y-axis direction; and a direction perpendicular to both X-axis and Y-axis directions is indicated as Z-axis direction. In this embodiment, an extending direction of metal thin wires that are included in a polarization layer is set to be in X-axis direction, and an alignment axis of the metal thin wires is set to be in Y-axis direction. In the accompanying drawings, the film thickness, the scale of each element, and the like are adequately changed, so that they are visible.

Polarization Element

As shown in FIG. 1, this polarization element 1 is provided with a polarization layer 14L formed on a substrate 12 and a protection film 16 covering the polarization layer 14L. The substrate 12 is composed of a translucent base made of glass, quartz, or plastic, for example. On the substrate 12, a plurality of metal thin wires 14 extending in X-axis direction are provided. The metal thin wires 14 are arranged in a shorter cycle than a wavelength of visible light at a constant interval along Y-axis direction and form the polarization layer 14L of a wire grid type. The polarization layer 14L is a reflective polarization layer that transmits linearly polarized light vibrating in a first direction orthogonal to an extending direction of the metal thin wires 14 (Y-axis direction) and reflects linearly polarized light vibrating in a second direction orthogonal to the first direction (X-axis direction). The metal thin wires 14 are made of metal materials such as aluminum.

On the substrate 12, a protection film 16 is provided in a manner covering surfaces of the metal thin wires 14. The protection film 16 is composed of a translucent insulating film such as a silicon oxide film. The protection film 16 includes a first protection film 16a, a second protection film 16b, and a third protection film 16c. The first protection film 16a covers a sidewall of the metal thin wires 14 and extends in X-axis direction. The second protection film 16b covers an upper surface of the metal thin wires 14 and extends in X-axis direction. The third protection film 16c covers a surface, exposed at a gap between the metal thin wires 14, of the substrate 12 and extends in X-axis direction. A plurality of second protection films 16b contact with each other in Y-axis direction, and thus the second protection films 16b cover the whole upper surface of the polarization layer 14L in an integrated manner. A space surrounded by the first protection film 16a, the second protection film 16b, and the third protection film 16c is an air gap 15. The air gap 15 is vacuumed or is filled with air. A surface, that is an opposite surface to the surface contacting the polarization layer 14L, of the second protection film 16b is a protection surface 13. The protection surface 13 corresponds to a pattern of the metal thin wires 14, so that a part planarly overlapping with the metal thin wires 14 is raised and a part planarly overlapping with the air gap 15 is fallen, whereby the protection surface 13 is slightly waved.

As shown in FIG. 2, the metal thin wires 14 include a metal protruding body 14A made of a metal material such as aluminum and a mask M layered on the metal protruding body 14A. A width of the metal thin wires 14 is 50 nm, a height of the same is 250 nm, and an interval (a pitch) between the wires is 140 nm, for example. The metal thin wires 14 are arranged in Y-axis direction at a shorter cycle than the wavelength of visible light, forming the polarization layer 14L that transmits polarized light parallel to Y-axis direction and reflects polarized light parallel to X-axis direction.

The mask M is used as a mask when the metal thin wires 14 are formed in a method for manufacturing the polarization element 1 described later. The mask M is composed of a silicon oxide film, for example. The mask M protects the upper surface of the metal protruding body 14A made of aluminum or the like and has a function of enhancing an adhesion with respect to the protection film 16 composed of a silicon oxide film or the like. Further, the mask M encourages the grow of the protection film 16 on the upper surface parts of the metal thin wires 14, and enables a formation of the protection film 16 that covers the upper surface of the polarization layer 14L and includes the air gap 15 that is large between the metal thin wires. Here, the mask M may be removed after the metal protruding body 14A is patterned so as to form the metal thin wires 14 composed only of the metal protruding body 14A.

The thickness of the second protection film 16b (thickness in Z-axis direction) is 200 nm, for example. While the second protection films 16b that are adjacent are connected with each other in the present embodiment, the second protection films 16b are not necessarily connected with each other. A small gap may be formed between the second protection films 16b, for example. In this case, the protection film 16 is formed on each of the metal thin wires 14. Accordingly, a plurality of protection films 16 extending in X-axis direction are arranged in Y-axis direction at a constant interval.

The thickness of the first protection film 16a (thickness in Y-axis direction) is 10 nm to 50 nm, for example. The thickness of the first protection film 16a is set at an extent that a first protection film 16a and an adjacent first protection film 16a do not contact with each other (that is, the air gap 15 is formed between the first protection films 16a). The width of the second protection film 16b in Y-axis direction is larger than widths of the first protection films 16a and the metal thin wire 14 in Y-axis direction (sum of the width of the metal thin wire 14 in Y-axis direction and the widths of the first protection films formed at right and left lateral surfaces of the metal thin wire 14 in Y-axis direction). In a region between the metal thin wires, the air gap 15 having a taper shape, that is, such shape that an opening area is decreased as getting away from the substrate 12 is formed.

The thickness of the third protection film 16c (thickness in Z-axis direction) is 10 nm to 50 nm, for example. The third protection film 16c is formed in an integrated manner with the first protection film 16a and the second protection film 16b, and has a function of firmly fixing the metal thin wires 14 on the substrate 12. A space surrounded by the first protection film 16a, the second protection film 16b, and the third protection film 16c is the air gap 15, and the air gap 15 is separated from a space contacting the protection surface 13.

Method for Manufacturing Polarization Element

FIGS. 3A to 4E are diagrams for explaining a method for manufacturing the polarization element 1. FIGS. 3A to 3E are diagrams for explaining a forming process of the metal thin wires 14. FIGS. 4A to 4E are diagrams for explaining a forming process of the protection film 16. FIGS. 3A to 4E are sectional views corresponding to the sectional view of FIG. 2.

Figure 3A:
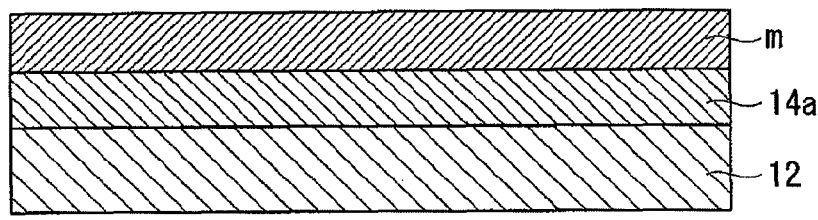
FIGS. 3A to 3E are sectional views showing a process for manufacturing a polarization element.

As shown in FIG. 3A, a translucent substrate 12 such as a glass substrate is prepared and a metal film 14a made of aluminum, for example, and a mask layer m such as a silicon oxide film are sequentially layered on one surface of the substrate 12. The metal film 14a and the mask layer m are formed on at least the whole area to which a polarization element is to be provided. As a method for forming the metal film 14a and the mask layer m, known methods such as vapor deposition and sputtering can be used. The metal film 14a is made of aluminum in the present embodiment. However, the metal film 14a may be made of gold, silver, copper, palladium, platinum, rhodium, silicon, nickel, cobalt, manganese, iron, chromium, titanium, ruthenium, niobium, neodymium, ytterbium, yttrium, molybdenum, indium, bismuth, or their alloys, for example. Further, while the silicon oxide film is used as the mask layer m in the present embodiment, other silicon compound films such as a silicon nitride film and a silicon oxide nitride film may be used.

Figure 3B:
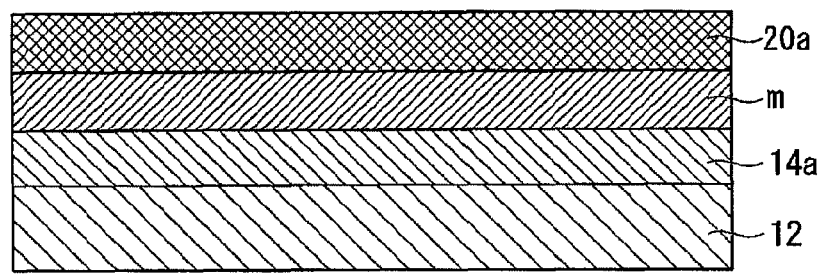

Thereafter, as shown in FIG. 3B, a resist material is deposited on the mask m by spin-coating and the material is prebaked so as to form a resist layer 20a. Then the resist layer 20a is exposed to light by a two-beam interference exposure method using a laser beam having a wavelength of 266 nm, for example, as exposing light. Here, the resist layer 20a is exposed to light so as to form a fine stripe pattern having a pitch being smaller or equal to the wavelength of visible light (140 nm, for example).

Figure 6:
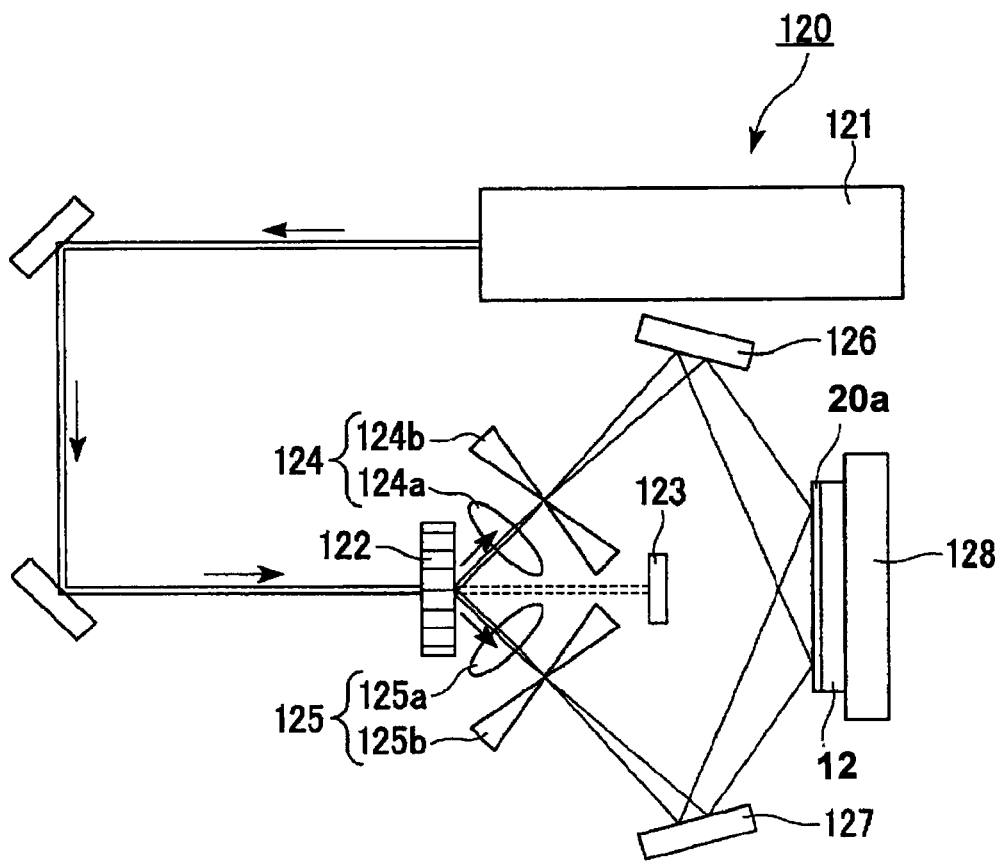
FIG. 6 is a schematic view illustrating a structure of an exposing device used for manufacturing a polarization element.

The aligner shown in FIG. 6, for example, can be used for the two-beam interference exposure. An aligner 120 includes a laser light source 121 emitting exposure light, a diffraction beam splitter 122, a monitor 123, beam expanders 124 and 125, mirrors 126 and 127, and a stage 128 for placing the substrate 12 thereon.

The laser light source 121 is an Nd:YVO4 laser device that has a fourth harmonic wave of 266 nm, for example. The diffraction beam splitter 122 is a splitting means for splitting a single laser beam outputted from the laser light source 121 to generate two laser beams. The diffraction beam splitter 122 generates two diffraction beams (±first order) having the same intensity as each other, if an incident laser beam is TE polarized. The monitor 123 receives light outputted from the diffraction beam splitter 122 and converts it into an electric signal. This aligner 120 can adjust a crossing angle of the two laser beams and the like based on the electric signal obtained by the conversion.

The beam expander 124 includes a lens 124a and a space filter 124b, and expands the beam diameter of one of the two laser beams split by the diffraction beam splitter 122 to, for instance, approximately 300 mm. In the same manner, the beam expander 125 includes a lens 125a and a space filter 125b, and expands the beam diameter of the other of the two laser beams split by the diffraction beam splitter 122. The mirrors 126 and 127 respectively reflect the laser beams transmitting through the beam expanders 124 and 125 toward the stage 128. The mirrors 126 and 127 cross the laser beams that they reflect so as to generate interference light and irradiate the resist layer 20a on the substrate 12 with the interference light. Thus the resist layer 20a is irradiated with the interference light with such aligner 120, being able to expose the resist layer 20a with light at a narrower forming pitch than the wavelength of the laser light source 121.

Figure 3C:
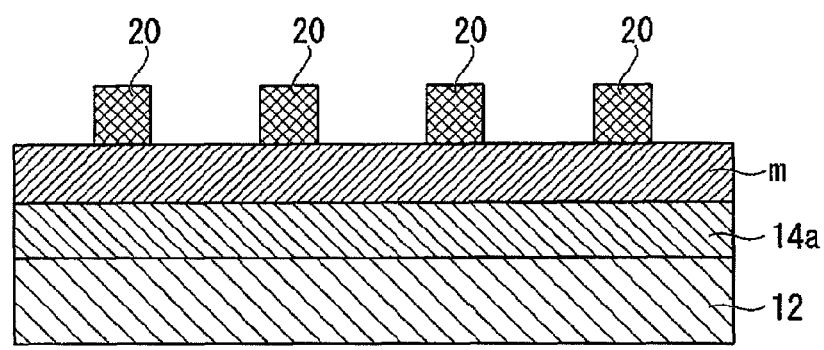

Then, as shown in FIG. 3C, the resist layer 20a is baked (PEB) after exposed with light so as to develop the resist layer 20a. Accordingly, the resist 20 having a stripe pattern is formed on the mask layer m.

Figure 3D:
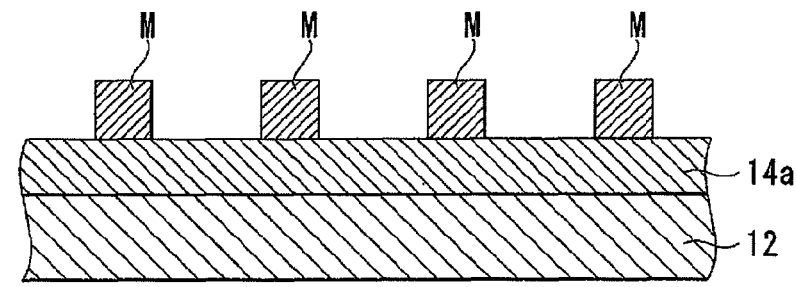

As shown in FIG. 3D, the mask layer m is patterned by dry etching through the resist 20 so as to form a mask M. The resist 20 may be removed after the mask M is formed. Even if the resist 20 is not removed, the resist 20 is etched in patterning of a metal film 14a described later, causing no problem.

Figure 3E:
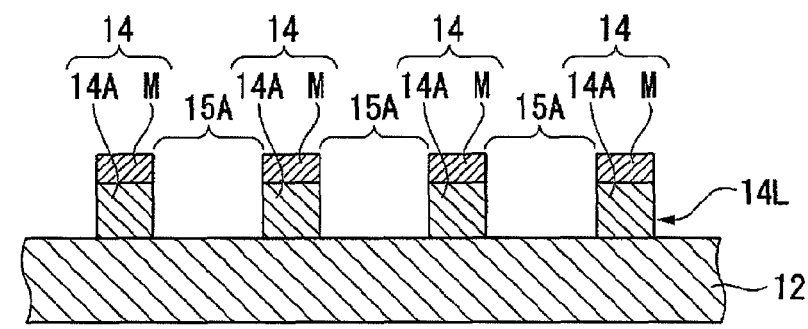

As shown in FIG. 3E, the metal film 14a is patterned by dry etching through the mask M so as to form the metal thin wires 14. The metal thin wires 14 have a double layered structure including the metal protruding body 14A composed of a metal film and the mask M composed of an inorganic insulating layer. The metal thin wires 14 are formed on the substrate 12 in a stripe state. Between the metal thin wires 14, grooves 15A exposing the substrate 12 are formed. The metal thin wires 14 and the grooves 15A are formed alternately at a fine pitch. Thus they are arranged at a shorter cycle than the wavelength of visible light, forming the polarization layer 14L of a reflective type. FIG. 3E shows the metal thin wires 14 having the double layered structure composed of the metal protruding body 14A and the mask M. However, the mask M is not necessary, so that the mask M may be removed after the metal film 14a is patterned.

Figure 4A:
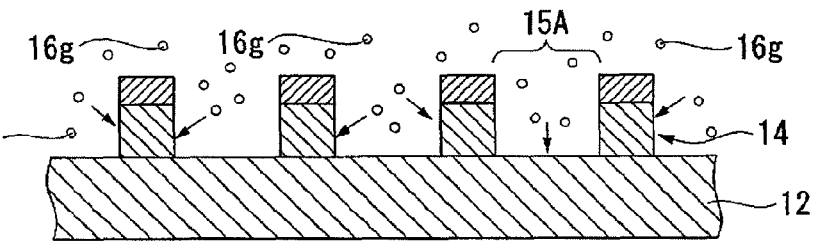
FIGS. 4A to 4E are sectional views showing a process for manufacturing a polarization element.

Next, as shown in FIG. 4A, a protection film is formed on the metal thin wires 14 by CVD. The CVD is such method that a material of a thin film is supplied in a vapor manner and is allowed to initiate a chemical reaction at a desired position so as to form a thin film. The CVD method can form a film on a surface having any shape if vapor of a material spreads around. Therefore, if a protection film for a wire grid type polarization element is formed by the CVD method, vapor of a material is allowed to react after it evenly goes around also between the metal thin wires. A substance generated by the reaction of the material attaches a surface of any solid object to be the protection film and grows in the reaction, so that the protection film can be evenly formed on a metal or non-metal object. Accordingly, the protection film can be formed on the whole parts exposed under a reaction atmosphere of the CVD method. The exposed parts include the upper end and the sidewall of the metal thin wires and the surface of the substrate exposed between the metal thin wires. Thus the metal thin wires can be reinforced.

Other than the CVD method, examples of forming the protection film 16 may include vapor deposition and sputtering that are methods generally used. However, in the vapor deposition, a discharging angle from a position where a film material is placed in a machine used for the deposition to a forming surface of the protection film varies depending on a position on the forming surface. Thus a distance between the film material and the forming surface is not constant in a precise sense. This causes a difference in the thickness of the protection film to be formed, resulting in nonconstant quality of the polarization element. Further, in the sputtering, the film forming speed is too low, being not able to achieve a film forming speed expected in the embodiment. Accordingly, it is practicable that the film forming is conducted by the CVD method.

As shown in FIG. 4A, the substrate 12 provided with the metal thin wires 14 is placed under the working environment of the CVD method and a material gas 16g for the protection film 16 is supplied. The material gas 16g reaches also the substrate 12 exposed at bottom surfaces of the grooves 15A. In the present embodiment, silicon oxide is formed as the protection film 16, and a mixture gas of tetraethoxysilane (TEOS) and oxygen ($O_2$) is used as the material gas 16g. The figure does not separately show TEOS and $O_2$, but the figure shows both of them as the material gas 16g. Other than silicon oxide, the protection film 16 may be made of an insulating material such as silicon nitride (SiN), silicon nitrogen oxide (SiON), and alumina ($Al_2O_3$), and the material gas 16g can be appropriately selected correspondingly to the protection film 16 that is selected. As the CVD method, thermal CVD method or plasma CVD method can be employed. The present embodiment employs the thermal CVD method. Reaction conditions of the present embodiment are as the following: gas flow amount of TEOS/$O_2$=12/388 sccm, pressure of 50 Pa, reaction temperature of 200° C., and reaction time of 2 minutes.

Figure 4B:
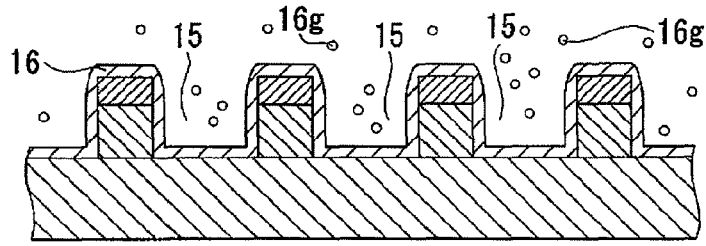

As shown in FIG. 4B, if the material gas 16g is allowed to react, a substance that is generated by the chemical reaction is deposited on surfaces of the metal thin wires 14 and the substrate 12 that are close to the substance to be the protection film 16. The film-forming speed of the protection film 16 is, for example, 100 nm/min. In the early stage of the film forming, the protection film 16 is formed on the surface of the substrate 12 exposed at the bottom surface of the grooves 15A, on the lateral surfaces of the metal thin wires 14, and on the upper ends of the wires 14. As the reaction progresses, the protection film 16 grows to be thick. Therefore, the protection film 16 grows in an orthogonal direction to the substrate 12 in a manner wrapping the upper ends of the metal thin wires 14. An interval between the protection films 16 formed on the upper ends of the metal thin wires 14 becomes narrow at an extent of the thickness that the protection films 16 grows. Accordingly, the protection films 16 formed on the bottom surfaces and the lateral surfaces of the grooves 15A form the air gaps 15 together with the protection films 16 formed on the upper ends of the metal thin wires 14.

Figure 4C:
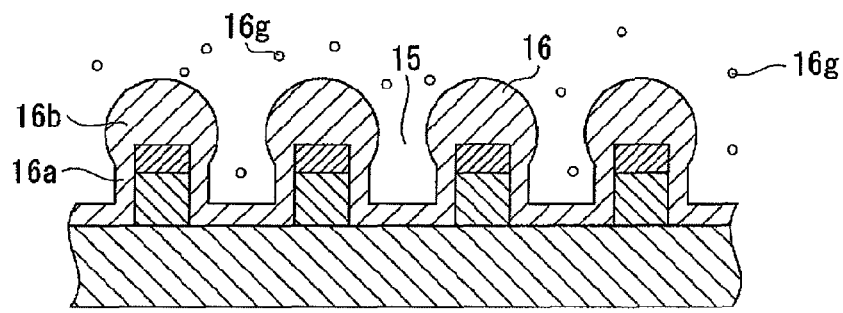

As shown in FIG. 4C, if the reaction further progresses, the interval between the metal thin wires 14 that are adjacent becomes narrower at an extent of the thickness of the protection films 16. Thus, it becomes hard for the material gas 16g to enter the air gaps 15. Therefore, the material gas 16g reacts continuously at the protection film 16 formed on the upper ends of the metal thin wires 14 before the material gas 16g enters the air gaps 15, so that the formation of the protection film 16 is preferentially progressed at the upper ends.

Figure 5:
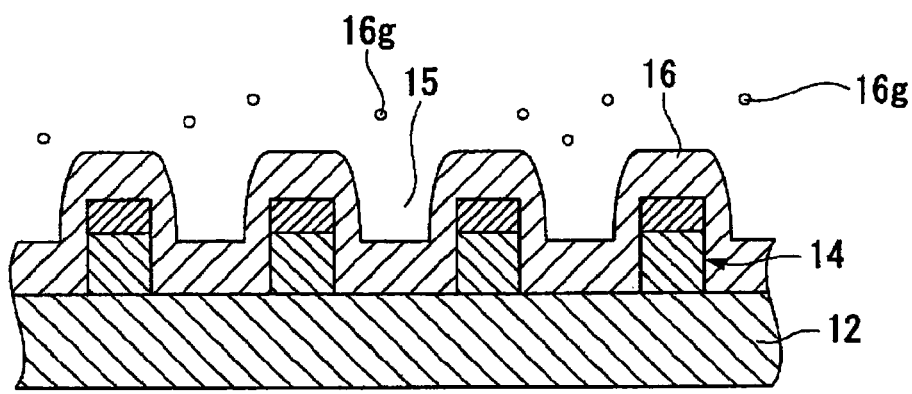
FIG. 5 is a sectional view schematically showing a case where a film-forming speed is low.

In a case where the reaction speed is low, there is enough time during which the material gas 16g goes around the air gaps 15 even though the interval between the metal thin wires 14 is narrowed. Therefore, as shown in FIG. 5, the protection film 16 is not preferentially formed on the upper ends of the metal thin wires 14, but the reaction progresses on the whole of the protection film 16, to which the material gas 16g contacts, formed on the sidewalls and upper ends of the metal thin wires 14 and the surface of the substrate 12. Accordingly, the air gaps 15 are gradually filled with the protection film 16 to be formed. The structure in which the air gaps 15 are filled as described is not preferable on the optical characteristics, so that the reaction speed is increased so as to form the air gaps 15 in this embodiment.

Figure 4D:
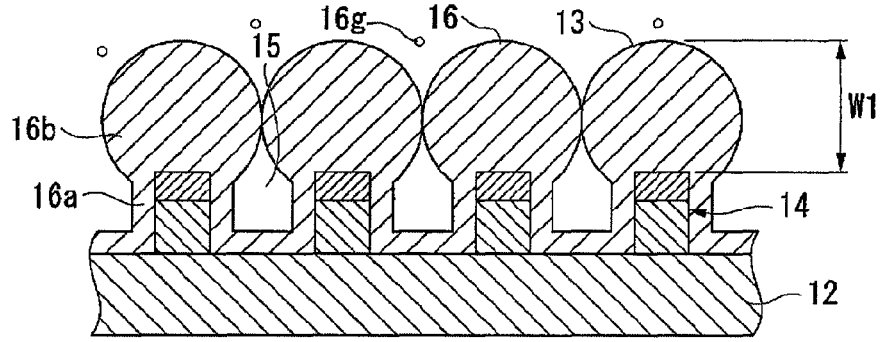

As shown in FIG. 4D, if the reaction furthermore progresses, the protection films 16 that continue to grow on the upper ends of the metal thin wires 14 which are adjacent contact with each other. Accordingly, the air gap 15 surrounded by the protection films 16 is formed between the metal thin wires 14 that are adjacent. The protection films 16 contacting with each other at the upper ends of the metal thin wires 14 form the protection surface 13 contacting with the material gas 16g. In this state, the thickness, in a vertical direction to the substrate 12, of the protection film 16 formed on the upper ends of the metal thin wires 14 (thickness W1 in the figure) is, for example, 50 nm.

Figure 4E:
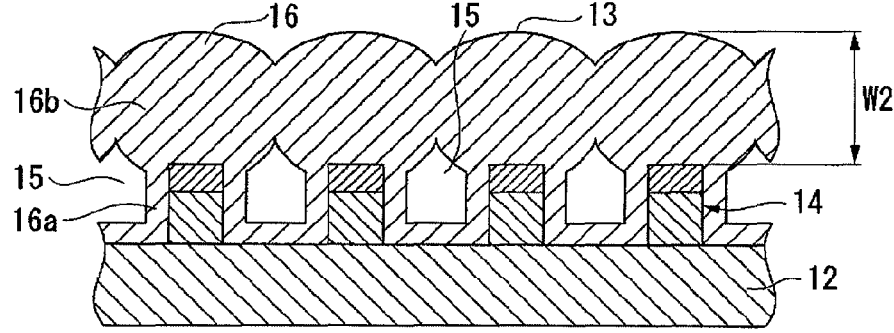

As shown in FIG. 4E, if the reaction furthermore progresses, the protection film 16 is formed on the protection surface 13 and thus the protection film 16 fill concavity and convexity. Thus the protection surface 13 becomes flat. In this state, the thickness, in a vertical direction to the substrate 12, of the protection film 16 formed on the upper ends of the metal thin wires 14 (thickness W2 in the figure) is, for example, 200 nm. Consequently, the polarization element 1 of the present embodiment is completed.

According to the polarization element 1 obtained as above, the metal thin wires 14 are covered by the protection film 16 at the upper end and the sidewall thereof, so that the metal thin wires 14 can be prevented from being damaged. Further, since the width of the second protection film 16b in the alignment axis direction is larger than the sum of the width of the metal thin wire 14 in the alignment axis direction and the widths of the first protection films 16a formed on both sidewalls of the metal thin wire 14, the upper part of the groove 15A is narrowed. Therefore, in a case where other material is deposited on the metal thin wires 14 as well, the deposited substance can be prevented from entering the groove 15A by the protection film 16. Accordingly, the groove 15A is not filled, providing excellent optical characteristics.

Further, in the embodiment, the second protection films 16b formed on the upper ends of adjacent metal thin wires 14 contact with each other in a direction parallel to the alignment axis direction. Accordingly, the air gap 15 that can be filled with air (or be vacuumed) is formed between the metal thin wires 14, being able to provide the polarization element 1 having excellent optical characteristics. This structure can protect the metal thin wires 14 more firmly than a case of protecting by the second protection film 16b that is separately formed on each of the wires 14.

In the embodiment, the protection film 16 is made of translucent insulating material. Since the metal thin wires 14 are covered by the insulating material to be insulated from the surrounding area, the metal thin wires 14 do not conduct with wirings of a device in a case where the polarization element 1 is mounted on the device. Accordingly, the device can drive stably.

According to the method for manufacturing the polarization element 1 having the structure described above, the protection film 16 is formed by the CVD method. Therefore, the protection film 16 is formed on parts to which the material gas 16g reaches, that is, the upper ends and the sidewalls of the metal thin wires 14 and the surface of the substrate 12 facing the grooves 15A, being able to reinforce the metal thin wires 14. Further, due to high film-forming speed of the CVD method, if the film forming progresses, the film forming reaction starts to occur before the material gas 16g spreads in the air gap 15. Thus the protection film grows preferentially at the upper ends of the metal thin wires 14. Finally, the film growth between the metal thin wires 14 stops. Thus the manufacturing method can provide the polarization element 1 having excellent optical characteristics that the gap between the metal thin wires 14 is not filled with the protection film 16.

Further, in the embodiment, the second protection film 16b formed on the upper end of the metal thin wires 14 has the thickness of 200 nm from the upper end of the wires 14 in a direction perpendicular to the substrate. Thus the thickness is grater or equal to 50 nm. If the protection film 16 is allowed to grow until it gains this thickness, the second protection films 16b formed on the upper ends of the metal thin wires 14 that are adjacent can be securely connected with each other. Accordingly, the metal thin wires 14 can be protected firmly, and the air gap 15 provided between the metal thin wires 14 prevents the deterioration of the optical characteristics caused by the protection film forming, being able to manufacture the polarization element 1 maintaining the optical characteristics.

While single kind of protection film 16 is used in the embodiment, a plurality of deposited films may be further formed on the surface of the protection surface 13 so as to form a protection layer 22.

Figure 7:
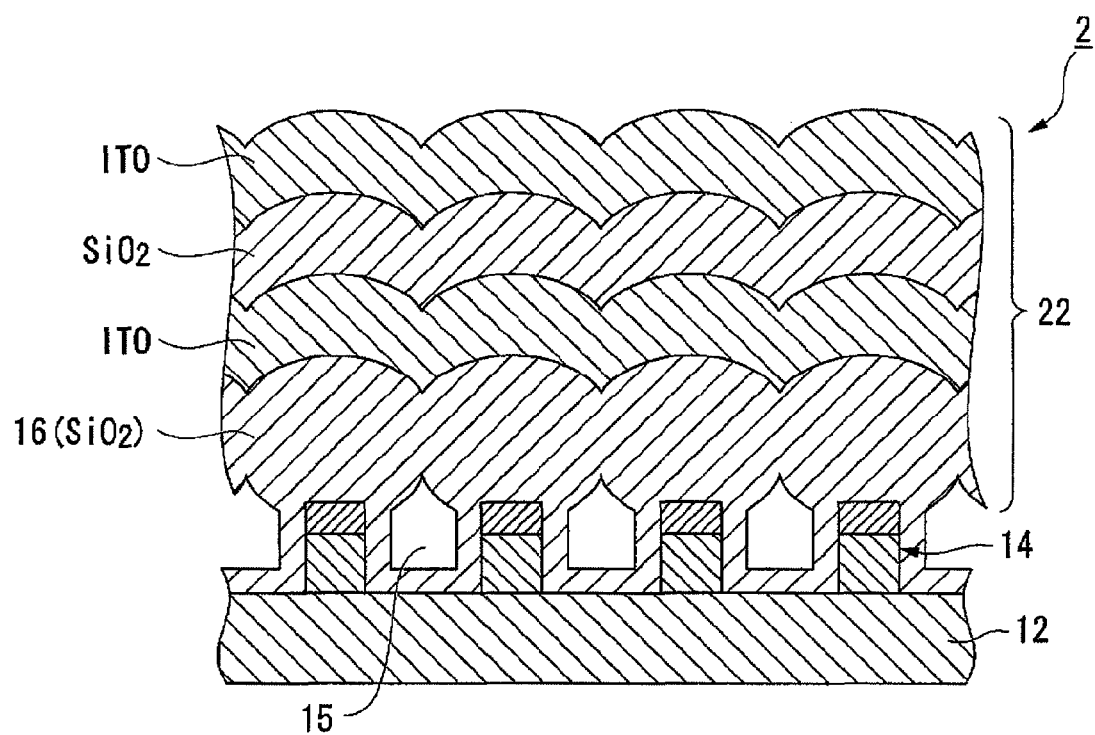
FIG. 7 is a sectional view schematically showing a case where a protection layer for a metal thin wire is formed with a plurality of deposited films.

FIG. 7 is a sectional view showing a polarization element 2 in which a plurality of deposited films are further formed on the protection surface 13. Here, the deposited films form a multilevel structure in which silicon oxide and indium tin oxide (ITO) are provided alternately. Examples of materials of the deposited films other than silicon oxide and ITO described above include silicon nitride (SiN), silicon nitrogen oxide (SiON), and alumina ($Al_2O_3$). A forming method of the deposited films is not limited as long as desired films can be formed. The deposited films are formed by the CVD method in the present embodiment. In the polarization element 2, after a material gas changed correspondingly to ITO is allowed to react so as to form an ITO film on the protection surface 13, the silicon oxide and the ITO film are formed repeatedly by the CVD method, forming the protection layer 22 on the whole of the upper end of the metal thin wires 14. The ITO film can be used as an electrode.

According to this structure, the deposited film (ITO film) having conductivity is separately formed on the surface of the protection film 16. The ITO film can be used as an electrode such as a pixel electrode. Therefore, the polarization element can be further reinforced and can be provided with a function depending on the characteristics of the deposited film.

Liquid Crystal Device

Figure 8:
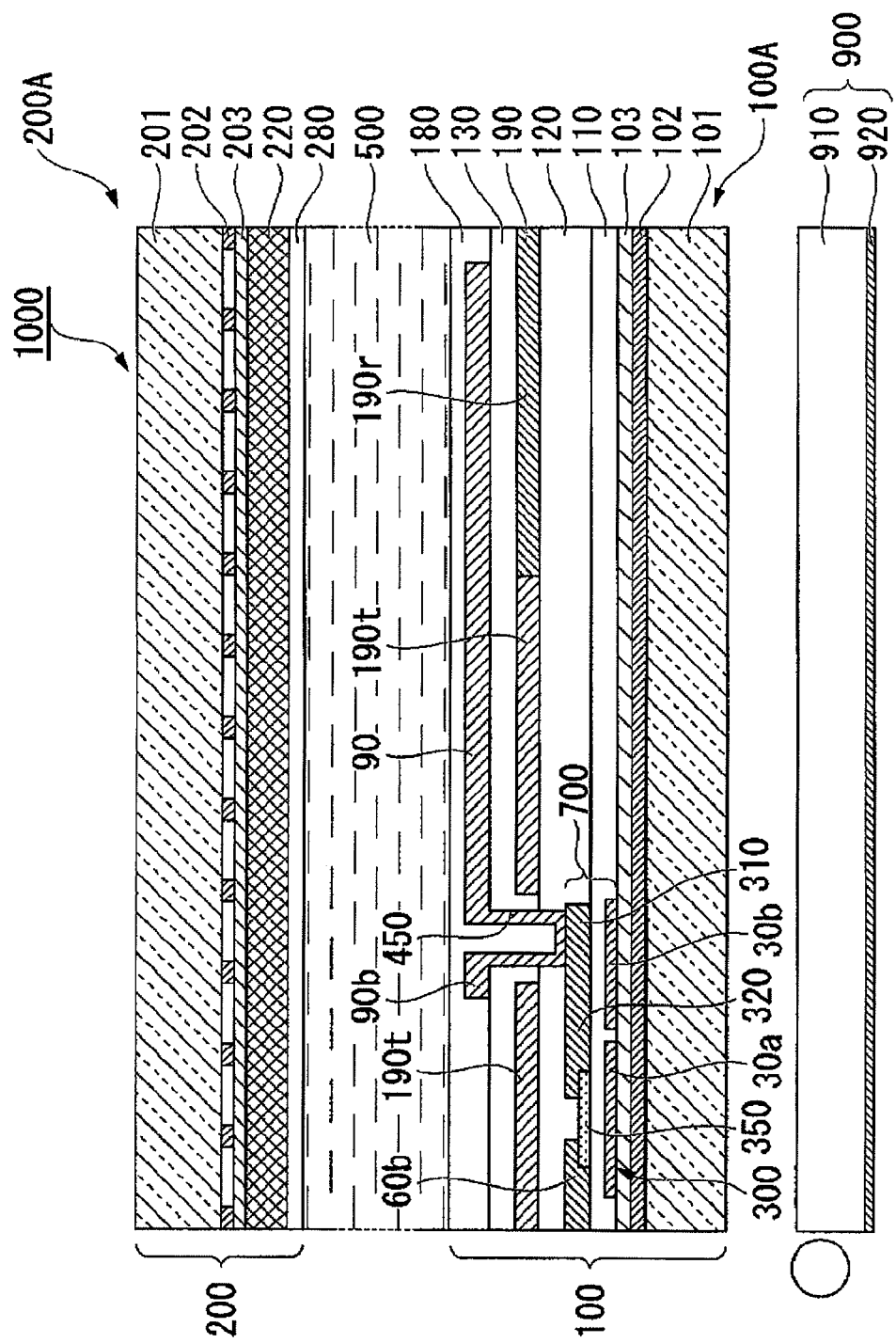
FIG. 8 is a schematic view illustrating a structure of a liquid crystal device provided with the polarization element of the embodiment.

FIG. 8 is a sectional view illustrating a frame format of a liquid crystal device 1000 provided with the polarization element according to the invention. The liquid crystal device 1000 is a transflective liquid crystal device driven by an in-plane switching mode.

The liquid crystal device 1000 has such structure that a liquid crystal layer 500 is sandwiched in between a TFT array substrate (a first substrate) 100 and a counter substrate (a second substrate) 200. The liquid crystal layer 500 is sealed between the substrates 100 and 200 with a sealing material (not shown) provided along an edge of a region where the TFT array substrate 100 and the counter substrate 200 face each other. On a back surface side (a lower surface side in the drawing) of the TFT array substrate 100 is provided a backlight (illuminating device) 900 including a light guiding plate 910 and a reflecting plate 920.

The TFT array substrate 100 and the counter substrate 200 are respectively provided with a polarization element 100A and a polarization element 200A. The polarization elements 100A and 200A are manufactured by the manufacturing method described above, and respectively have a structure in which metal thin wires provided with a protection film are formed on a translucent substrate made of glass, quartz, plastic, or the like.

The polarization element 100A includes a substrate 101, metal thin wires 102, and a protection film 103, while the polarization element 200A includes a substrate 201, metal thin wires 202, and a protection film 203. The substrates 101 and 201 serve as substrates of the liquid crystal device as well as substrates of the polarization elements in the embodiment. The metal thin wires 102 and 202 are disposed in a manner intersecting with each other. Both of the polarization elements 100A and 200A are disposed such that the metal thin wires are positioned at an internal side (a side closer to the liquid crystal layer 500).

At the internal side of the polarization element 100A, a scanning line 30a and a capacitance line 30b are formed. Covering the scanning line 30a and the capacitance line 30b, a gate insulating film 110 that is a transparent insulating film made of silicon oxide, for example, is formed.

On the gate insulating film 110, a semiconductor layer 350 made of amorphous silicon is formed, and a source electrode 60b and a drain electrode 320 are provided in a manner being partially placed on the semiconductor layer 350. In one edge part of the drain electrode 320, of which the other edge part is partially placed on the semiconductor layer 350, a capacitance electrode 310 are formed in an integrated manner. The semiconductor layer 350 is disposed to face the scanning line 30a with the gate insulating film 110 interposed therebetween. In the facing region, the scanning line 30a serves as a gate electrode of the TFT 300.

The capacitance electrode 310 is disposed to face the capacitance line 30b with the gate insulating film 110 interposed therebetween. In the region where the capacitance electrode 310 faces the capacitance line 30b, a storage capacitance 700 having the gate insulating film 110 as a dielectric film thereof is formed.

Covering the semiconductor layer 350, the source electrode 60b, the drain electrode 320, and the capacitance electrode 310, a first inter-layer insulating film 120 made of silicon oxide or the like is formed. On the first interlayer insulating film 120, a common electrode 190 is formed. The common electrode includes a transparent common electrode 190t made of the transparent conductive material such as ITO and a reflective common electrode (reflective polarizing layer) 190r mainly composed of a reflective metal film made of aluminum, for example.

Covering the common electrode 190 (190t and 190r), a second inter-layer insulating film 130 made of silicon oxide or the like is formed, and on the second inter-layer insulating film 130, a pixel electrode 90 made of transparent conductive material such as ITO is formed.

A pixel contact hole 450 is formed in a manner penetrating the first inter-layer insulating film 120 and the second inter-layer insulating film 130 so as to reach the capacitance electrode 310. In this pixel contact hole 450, a contact portion 90b of the pixel electrode 90 is partially embedded, electrically connecting the pixel electrode 90 and the capacitance electrode 310. Here, corresponding to a forming region of the pixel contact hole 450, an opening is formed through the common electrode 190, so that the common electrode 190 is not brought into contact with the pixel electrode 90. In a region covering the pixel electrode 90 on the second inter-layer insulating film 130, an alignment film 180 made of polyimide or the like is provided.

At the internal side of the polarization element 200A included in the counter substrate 200, a color filter 220 and an alignment film 280 are layered. At an external side of the counter substrate 200, a phase difference plate and other optical elements may be provided.

It is preferable that the color filter 220 be divided into two types of regions having different chromaticities from each other in a pixel region. For example, such structure can be employed that a first coloring material region is provided in a manner corresponding to a planar region of the transparent common electrode 190t included in a transmission display region, while a second coloring material region is provided in a manner corresponding to a planar region of the reflective common electrode 190r included in a reflective display region, and a chromaticity of the first coloring material region is larger than that of the second coloring material region. Such structure can prevent uneven chromaticities between the transmission display region where display light is transmitted through the color filter 220 only once and the reflective display region where the display light is transmitted through the color filter 220 twice. Thus, equal visual quality can be maintained in the reflection display and the transmission display, thereby improving display quality.

According to the liquid crystal device 1000 of the embodiment, the polarization elements 100A and 200A are built in the device 1000, so that the substrates 101 and 201 serve as substrates of the liquid crystal device as well as substrates of the polarization elements. This structure can reduce the number of elements used in the device, thereby making the whole device thinner and improving the function of the liquid crystal device 1000. Further, since the device structure is simplified, cost reduction can be also achieved. In addition, the polarization elements 100A and 200A included in the liquid crystal device 1000 are firmly protected by the protection films 103 and 203. Therefore, the polarization elements 100A and 200A can be prevented from being damaged in a manufacturing process of the liquid crystal device 1000, especially in a rubbing process for forming the alignment film 280, being able to realize high yield manufacturing. Further, the polarization elements that are used include air gaps in which air can be sealed between the metal thin wires, enabling an excellent display.

While the both in a pair of substrates that sandwich the liquid crystal layer include the polarization element at the liquid crystal layer side of the substrates in the embodiment, only one of the substrates may include the polarization element.

While the polarization element is used in a transflective liquid crystal device driven by an in-plane switching mode in the embodiment, it may be used in a transmission type liquid crystal device and a reflection type liquid crystal device.

Electronic Apparatus

Figures 9, 10:
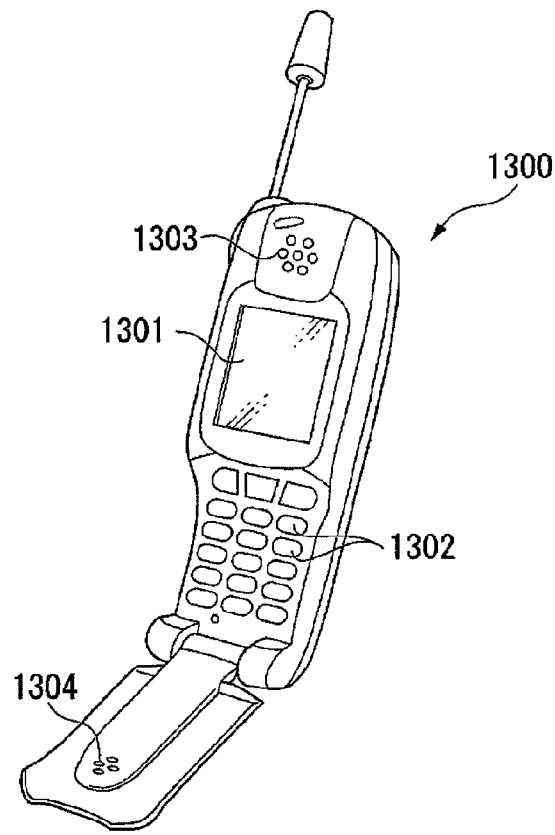
FIG. 9 is a perspective view showing a cellular phone that is an example of an electronic apparatus.
FIG. 10 is a table showing a working example of the invention.

FIG. 9 is a schematic view showing a structure of a cellular phone that is an example of an electronic apparatus provided with the liquid crystal device according to the invention at its display. This cellular phone 1300 includes a display 1301 that is a small size liquid crystal display device of the invention, a plurality of operation buttons 1302, an ear piece 1303, and a mouthpiece 1304.

The cellular phone 1300 of the embodiment includes the liquid crystal device that has a substrate serving as a substrate for the device and a substrate for a polarization element so as to thin the whole device. Thus the whole of the cellular phone 1300 can be thinned. Further, the polarization element is firmly protected by a protection film and includes an air gap to which air can be sealed between adjacent metal thin wires, providing an electronic apparatus having high reliability and excellent display property.

The liquid crystal device of the embodiment can be preferably used not only for the cellular phone described above but also for image display means of the following electronic apparatuses: electronic books; personal computers; digital still cameras; liquid crystal display televisions; projectors; video tape recorders of viewfinder type or monitor direct-viewing type; car navigation devices; pagers; electronic notebooks; electric calculators; word processors; work stations; picture phones; POS terminals; apparatuses equipped with a touch panel, and so on.

While the embodiment according to the invention has been described with reference to the accompanied drawings, it is needless to say that the invention is not limited to the above embodiment. The shapes, the combinations and the like of the members described in the above embodiment are an example, and various modifications can be made based on a design demand or the like without departing from the scope of the invention.

Working Examples

Results of an evaluation on intensity of a polarization element with respect to rubbing will be described as a working example of the invention.

To a sample (CVD sample) evaluated in the working example, a protection film was formed under the following reaction conditions of the CVD method: gas flowing amount of $TEOS/O_2=12/388$ sccm, pressure of 40 Pa, reaction temperature of 110° C., and reaction time of 2 minutes. A film forming rate of the protection film was 103 nm/min. As a comparative example, a polarization element in which a protection film having a similar film thickness was formed by sputtering (sputter sample) was evaluated. The reaction conditions under the sputtering were the following: gas flowing amount of $Ar/N_2=30/7$ sccm and reaction time of 60 minutes. A film forming rate of the protection film was 2.2 nm/min.

Intensity was evaluated such that a polyimide film is formed on each of the sample polarization elements that were prepared and rubbing treatment was performed in two directions parallel and vertical to an extending direction of the metal thin wires under two conditions of rotation velocity of a rubbing roll.

FIG. 10 is a table showing results of the evaluation on the intensity of the polarization elements with respect to rubbing. FIG. 10 also shows detailed conditions for the evaluation. In the table of the results, "B" indicates a case where the metal thin wires were damaged by the rubbing treatment, while "A" indicates a case where the metal thin wires were not damaged. "Damaged" means cases where the metal thin wires incline in a rubbing direction or where the metal thin wires are peeled off from the substrate so as to lose a function as a polarization element.

As a result, the polarization element of the sputter sample was damaged under the evaluation conditions except for standard conditions shown in the table, while the CVD sample was not damaged under any conditions. Thus it was confirmed that rubbing resistance of the CVD sample was substantially improved.

What is claimed is:
1. A polarization element, comprising:
a base;
a plurality of metal thin wires provided on the base along a predetermined alignment axis; and
a plurality of protection films, one of the plurality of protection films covering one of the plurality of metal thin wires,
wherein the plurality of metal thin wires includes a first metal thin wire and a second metal thin wire, the first metal thin wire and the second metal thin wire being adjacent to each other,
wherein the plurality of protection films includes a first protection film provided on the first metal thin wire and a second protection film provided on the second metal thin wire,
wherein a first mask is provided between the upper end of the first metal thin wire and the first protection film provided on the first metal thin wire, the first mask being a mask through which the first metal thin wire is formed, wherein a second mask is provided between the upper end of the second metal thin wire and the second protection film provided on the second metal thin wire, the second mask being a mask through which the second metal thin wire is formed, wherein the first protection film provided on the first metal thin wire covers the first mask and both sidewalls of the first metal thin wire, and the second protection film provided on the second metal thin wire covers the second mask and both sidewalls of the second metal thin wire, wherein a width of a first part in a direction of the alignment axis, the first part being above the first mask, of the first protection film provided on the first metal thin wire is larger than a sum of a width of the first metal thin wire in the direction of the alignment axis and widths of second parts in a direction of the alignment axis, the second parts being on the both sidewalls of the first metal thin wire, of the first protection film provided on the first metal thin wire, wherein a third part, the third part being on a first sidewall of the sidewalls of the second metal thin wire, of the second protection film provided on the second metal thin wire forms an air gap with one of the second parts of the first protection film provided on the first metal thin wire, wherein the first sidewall is opposed to one of the sidewalls of the first metal thin wire where the one of the second parts is provided, and wherein the second and third parts have substantially the same thickness along lengths thereof in an orthogonal direction to the base.

2. The polarization element according to claim 1, wherein the first protection film provided on the first metal thin wire and the second protection film provided on the second metal thin wire contact with each other above the plurality of metal thin wires in the direction of the alignment axis.

3. The polarization element according to claim 2, wherein a plurality of deposited films are formed on an upper surface of the plurality of the protection films so as to form a protection layer.

4. The polarization element according to claim 1, wherein each of the protection films are made of a translucent insulating material.

5. The polarization element according to claim 1, wherein the first mask and the first protection film provided on the first metal thin wire are composed of the same material.

6. A liquid crystal device, comprising:
a pair of substrates;
a liquid crystal layer sandwiched in between the pair of substrates; The polarization element, according to claim 1, provided between the liquid crystal layer and one of the pair of substrates; and an alignment film provided between the liquid crystal layer and the polarization element and processed with rubbing treatment.

7. An electronic apparatus comprising the liquid crystal device according to claim 6 as an optical modulator.

8. A method for manufacturing a polarization element, comprising:
a) forming a metal film on a base;
b) forming a patterned mask on the metal film;
c) forming a plurality of metal thin wires provided on the base along a predetermined alignment axis by etching the metal film through the patterned mask; and
d) forming a plurality of protection films, one of the plurality of protection films covering an upper end and both sidewalls of one of the plurality of metal thin wires, wherein in the step d), the one of the plurality of protection films is formed on an upper end and both sidewalls of the one of the plurality of metal thin wires by a chemical vapor deposition (CVD) method without removing the patterned mask, and a first part, the first part being above the upper end of the one of the plurality of metal thin wires, of the one of the plurality of protection films is allowed to grow by further progressing the formation of the plurality of protection films so as to make a width of the first part of the one of the plurality of protection films in a direction of the alignment axis larger than a sum of a width of the one of the plurality of metal thin wires in the direction of the alignment axis and widths of second parts in the direction of the alignment axis, the second parts being on the both sidewalls of the one of the plurality of metal thin wires, of the one of the plurality of protection films, and wherein a thickness of the second parts is substantially uniform along lengths thereof in an orthogonal direction to the base.

9. The method for manufacturing a polarization element according to claim 8, wherein a material of the patterned mask is the same as a material of the plurality of protection films.

10. The method for manufacturing a polarization element according to claim 8, wherein a thermal CVD method is used as the chemical vapor deposition method.

11. The method for manufacturing a polarization element according to claim 8, wherein a thickness of the first part in an orthogonal direction to the base is larger than or equal to 50 nm.

* * * * *